Figure 1:
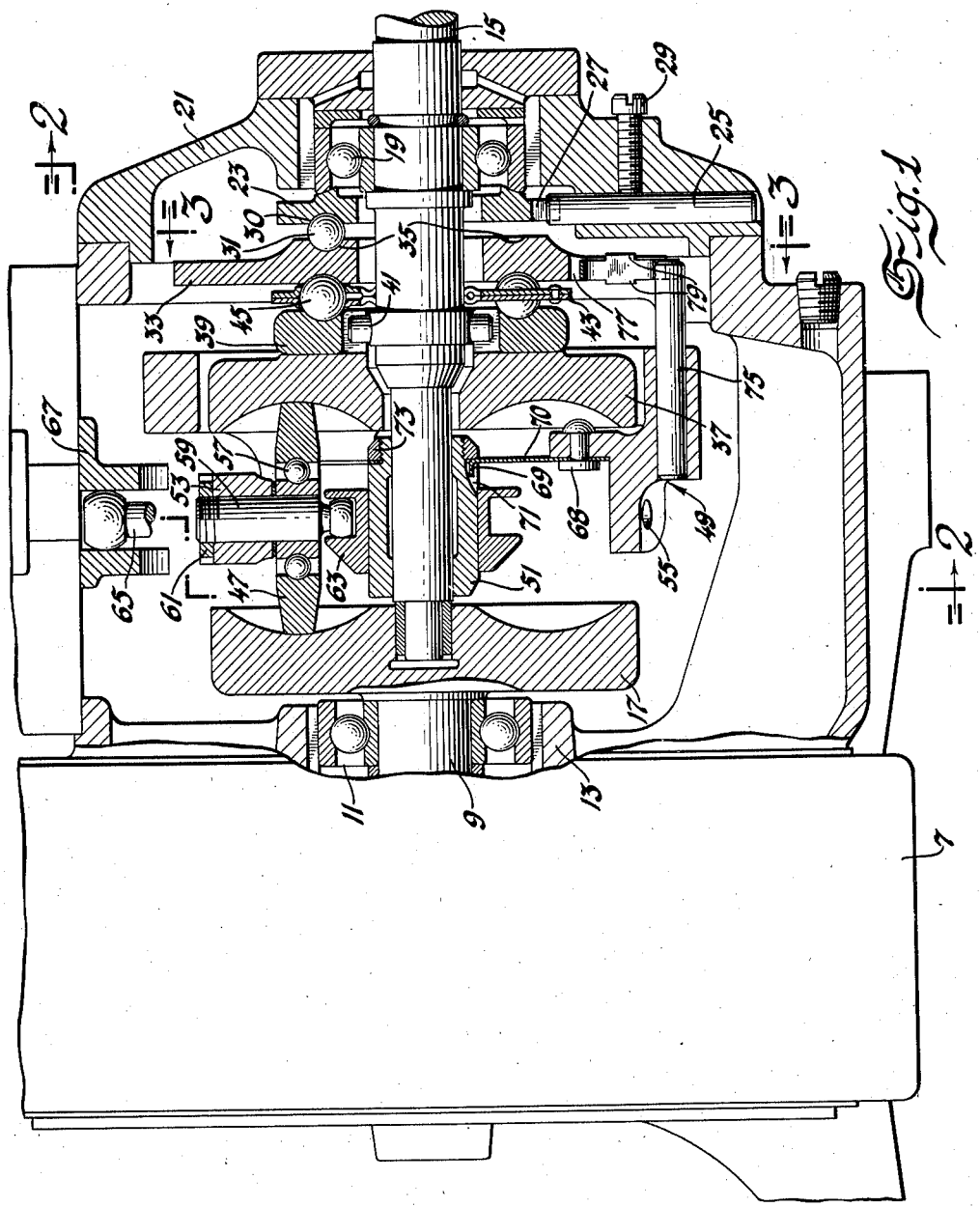

Inventor
Thomas C. Delaval-Crow

Patented May 9, 1939

2,157,259

UNITED STATES PATENT OFFICE 2,157,259

VARIABLE SPEED TRANSMISSION

Thomas C. Delaval-Crow, Bristol, Conn., assignor to General Motors Corporation, Detroit, Mich., a corporation of Delaware Application April 9, 1937, Serial No. 135,905

6 Claims. (Cl. 74—200)

This invention relates to ratio changing mechanism and more particularly to an improvement in change speed transmission employing a plurality of races and interposed ratio changing rollers.

It is designed to have particular utility where one race only is mounted for self-alignment and where the roller support or spider is centralized by a sleeve or the like on one or the other of the axially aligned shafts. In such an organization, the improved construction aims to afford some flexibility between the roller support and its locating sleeve in order to avoid cramping and binding, improver traction, loss of efficiency and failure of the bearings.

The invention also provides an improved connection between the roller support or spider and the torque loading flange designed especially for a construction where reaction torque loading is employed. The novel structure provides an effective means to introduce the necessary flexibility in the connection between the roller support or spider and the torque loading flange. The novel connection is designed to allow balancing of the pressures between the several rollers and the races and to prevent any disturbance of the tractive forces. Compared with prior expedients to introduce such flexibility, the novel connection herein described is simple and inexpensive, is free from fatigue failure such as may occur in cases where spring fingers are used to connect the spider and the torque loading flange. The construction also avoids vibration periods which may harmonize with other external fluctuations when spring fingers are used.

In the drawings:

Figure 1 is a view in longitudinal section through the novel ratio changing mechanism.

Figure 2:
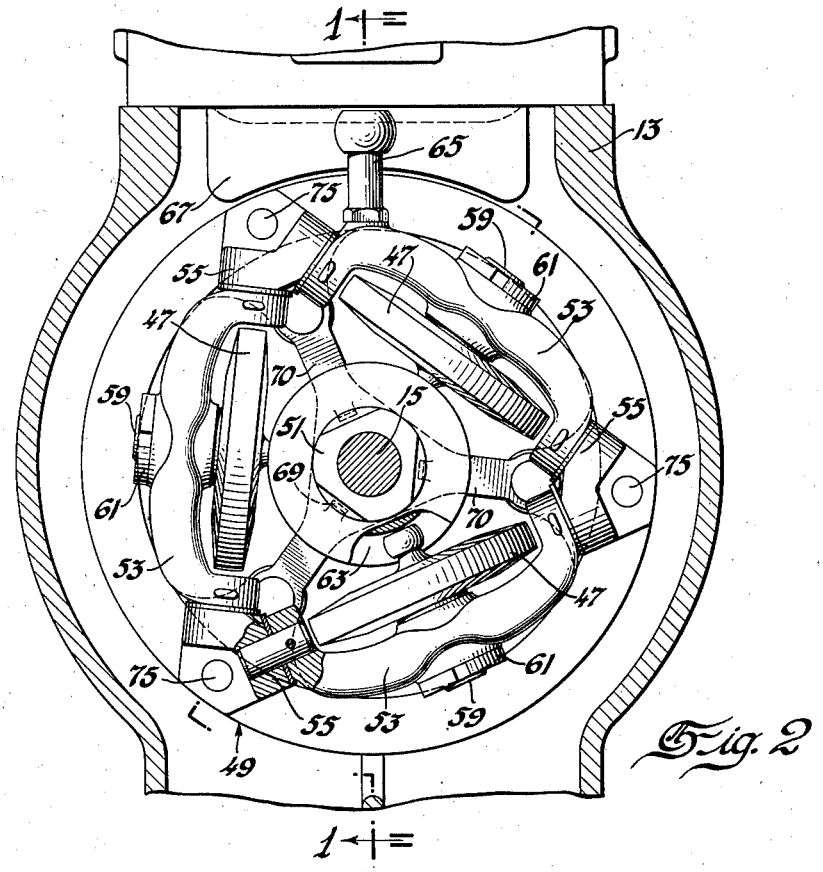
Figure 3:
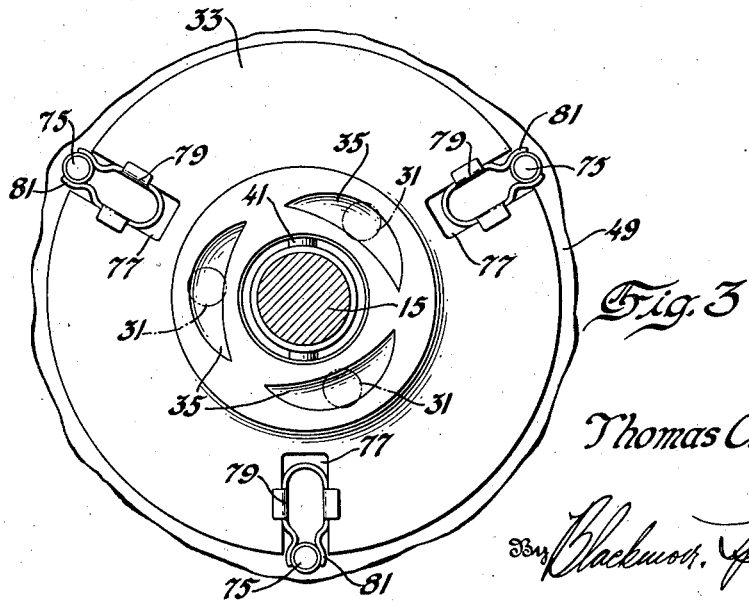

Figures 2 and 3 are sections as seen from lines 2—2 and 3—3 of Figure 1.

Referring by reference characters to the drawings, numeral 7 is used to represent a mounting frame. Driving shaft 9 from a power source is supported by two suitable bearings, one of which is shown at 11 located within annulus 13. An aligned output shaft 15 is to be driven from shaft 9 at a plurality of speeds by the use of a well-known form of race and roller change speed transmission.

Shaft 9 carries rigid therewith an input race 17, this race being positioned adjacent shaft bearing 11. Output shaft 15 may be piloted into race 17 as shown. Shaft 15 is supported in a ball bearing 19 carried by the cover 21 of the casing 13. Engaging the outer race of bearing 19 is a ring 23. Ring 23 is restrained from rotation by a casing carried pin 25 received within a notch 27 of the ring. A set screw 29 holds the pin in position. On the side of ring 23 remote from the bearing 19 are grooves 30 and rolling members or balls 31. Coaxial with shaft 15 and spaced slightly from ring 23 is a so-called torque loading flange 33. This flange is not restrained from rotation as is ring 23. Its face adjacent ring 33 has grooves 35 engaged by the balls 31. The grooves 35 in which the balls are located are tapered in depth and the rotation of ring 33 relative to ring 23 exerts axial pressure on the parts engaged thereby.

The second race 37 surrounds shaft 15 and is free to align itself therewith. On the side of race 37, adjacent the torque loading flange is a ring member 39, this ring adapted to rotate shaft 15 in response to the rotation of race 37 through the instrumentality of pins 41 extending from the shaft and into notches formed in the ring. A cage 43 carries balls 45 located in cooperating recesses of the ring 39 and the torque loading flange 33.

Between the races 17 and 37 are a plurality of rollers indicated by numeral 47. These rollers transmit the rotation of one race to the other. A cage or spider 49 is used to support the rollers. It takes the form of a ring and is located and centralized relative to the coaxial shafts, by an inner sleeve 51, the latter surrounding shaft 15. Carried by the roller support 49 are roller carriers 53, best seen in Figure 2. These carriers have their trunnion bearings at 55 for rotation in the ring 49. Each roller is mounted with bearings 57 to turn about a pin 59. The outer end of each pin is carried by a mid-portion of the carrier 53 being secured by a nut 61. The inner end of each pin is of rounded form and is received within the annular recess of a collar 63 slidably mounted on the sleeve 51. One of the carriers 53 has an arm 65 formed with a rounded head adapted to be engaged by the sliding member 67 of a suitable control device whereby the carrier may rotate about its trunnion bearings to tilt the roller and change the ratio. A similar tilting of the other rollers is accomplished by the sliding of the collar 63 through the instrumentality of the radially inner ends of the pins 59.

The sleeve is supported as stated on shaft 15. The connecting means between the sleeve and the spider serves to centralize the latter. Owing to the provision for self-alignment in the case of race 37, some provision should be made to prevent binding between the rollers and races. To perform this function, the connecting means between the sleeve and spider has been made in the form of a flexible plate 70. This flexible plate 70 extends radially and may be secured at its outer end by rivets 68. At its inner end it may have axially directed tongues 69 received in notches 71 and nut 73 may be threaded on the sleeve to secure the flexible plate 70 in position.

In the device as shown, the torque between the rollers and the input shaft as well as that between the rollers and the output shaft is received by the roller support 49 and is transmitted therefrom to the torque loading flange 33. For so transmitting the torque the ring 49 is provided with a plurality of axial pins 75 extending to radial notches 77 in the flange 33. Within each notch is a hairpin spring having arms 79 bent over the faces of the flange. The spring is shaped at its outer end as shown at 81 to embrace the pin 75. This resilient connection between the pins 75 and the torque loading flange is well calculated to provide a balancing between the races and rollers and it does not disturb the tractive forces therebetween. The construction wherein rigid pins are used as the connecting device avoids the more expensive spring fingers previously suggested, which fingers are also subject to fatigue failure and sometimes are the cause of troublesome vibrations when their vibration periods correspond to uncontrollable external vibrations.

I claim:

1. In a change speed transmission, coaxial input and output shafts, rollers and races therebetween, a self-aligning support for one of said races, a support for said rollers, a sleeve coaxial with said shafts for centralizing said roller support and axially yielding means between said sleeve and roller support.

2. In change speed transmission, coaxial input and output shafts, races carried by each of said shafts for rotation therewith, means constituting a self-aligning support for one of said races, a plurality of rollers transmitting the drive between said races, a roller support, a centralizing sleeve for said support mounted coaxially of said shafts and radially extending axially yielding means connecting said sleeve and roller support.

3. The invention defined by claim 2, said yielding means consisting of plate springs, said springs lying in a plane at a right angle to the axis of said shafts.

4. In a change speed transmission, coaxial input and output shafts, driving races and rollers therebetween, a torque loading device to exert pressure between said races and rollers, said loading device including a rotatably mounted flange, and means between said flange and one of said races operable to apply pressure in response to the torque between said rollers and races, a supporting cage for said rollers, and means connecting said cage to said flange comprising pins extending axially from said supporting cage and yielding means between said pins and said flange.

5. In a change speed transmission, coaxial input and output shafts, driving races and rollers therebetween, a torque loading device to exert pressure between said races and rollers, said device including a flange and coacting means between said flange and one of said races, a supporting cage for said rollers, and means connecting said cage to said flange comprising pins extending axially from said supporting cage, said flange having radial slots, and hairpin springs in said slots shaped to engage the ends of said pins.

6. In a change speed transmission, coaxial input and output shafts, driving races and rollers therebetween, a torque loading device to exert pressure between said races and rollers, said device including a flange and coacting means between said flange and one of said races, a supporting cage for said rollers, means to centralize said cage, yielding means connecting said support to said centralizing means, and means for connecting said supporting cage to said flange comprising pins extending axially from said supporting cage and yieldable means between said pins and said torque loading flange.

THOMAS C. DELAVAL-CROW.